166-307.

09-07-71    XR    3,603,398

United States Patent

[11] 3,603,398

| [72] | Inventors | Stanley O. Hutchison<br>Bakersfield;<br>John C. McKinnell, Taft, both of, Calif. |
|---|---|---|
| [21] | Appl. No. | 838,082 |
| [22] | Filed | July 1, 1969 |
| [45] | Patented | Sept. 7, 1971 |
| [73] | Assignee | Chevron Research Company<br>San Francisco, Calif. |

[54] METHOD OF PLACING PARTICULATE MATERIAL IN AN EARTH FORMATION WITH FOAM
1 Claim, 1 Drawing Fig.

[52] U.S. Cl. .................................................. 166/305,
166/278, 166/285, 166/307, 175/72
[51] Int. Cl. .................................................. E21b 43/04,
E21b 43/27, E21b 33/138
[50] Field of Search............................. 166/305,
278, 306, 308, 309, 274, 273, 263, 292, 285;
175/72, 69, 71

[56] References Cited
UNITED STATES PATENTS

| 3,136,361 | 6/1964 | Marx............................. | 166/308 |
| 3,185,634 | 5/1965 | Craig, Jr. et al............... | 166/273 |
| 3,330,346 | 7/1967 | Jacobs et al. ................. | 166/274 X |
| 3,330,352 | 7/1967 | Bernard....................... | 166/263 |
| 3,486,560 | 12/1969 | Hutchison et al............ | 166/308 X |
| 3,491,832 | 1/1970 | Raza............................. | 166/273 X |
| 3,495,665 | 2/1960 | Kelly, Jr. et al............... | 166/294 |

*Primary Examiner*—Stephen J. Novosad
*Attorneys*—A. L. Snow, F. E. Johnston, R. L. Freeland, Jr. and E. J. Keeling ABSTRACT: A method for placing material in an earth formation penetrated by a well by carrying such material down the well in a gas-liquid foam and moving said foam and material into a desired location in the earth formation.

PATENTED SEP 7 1971  3,603,398
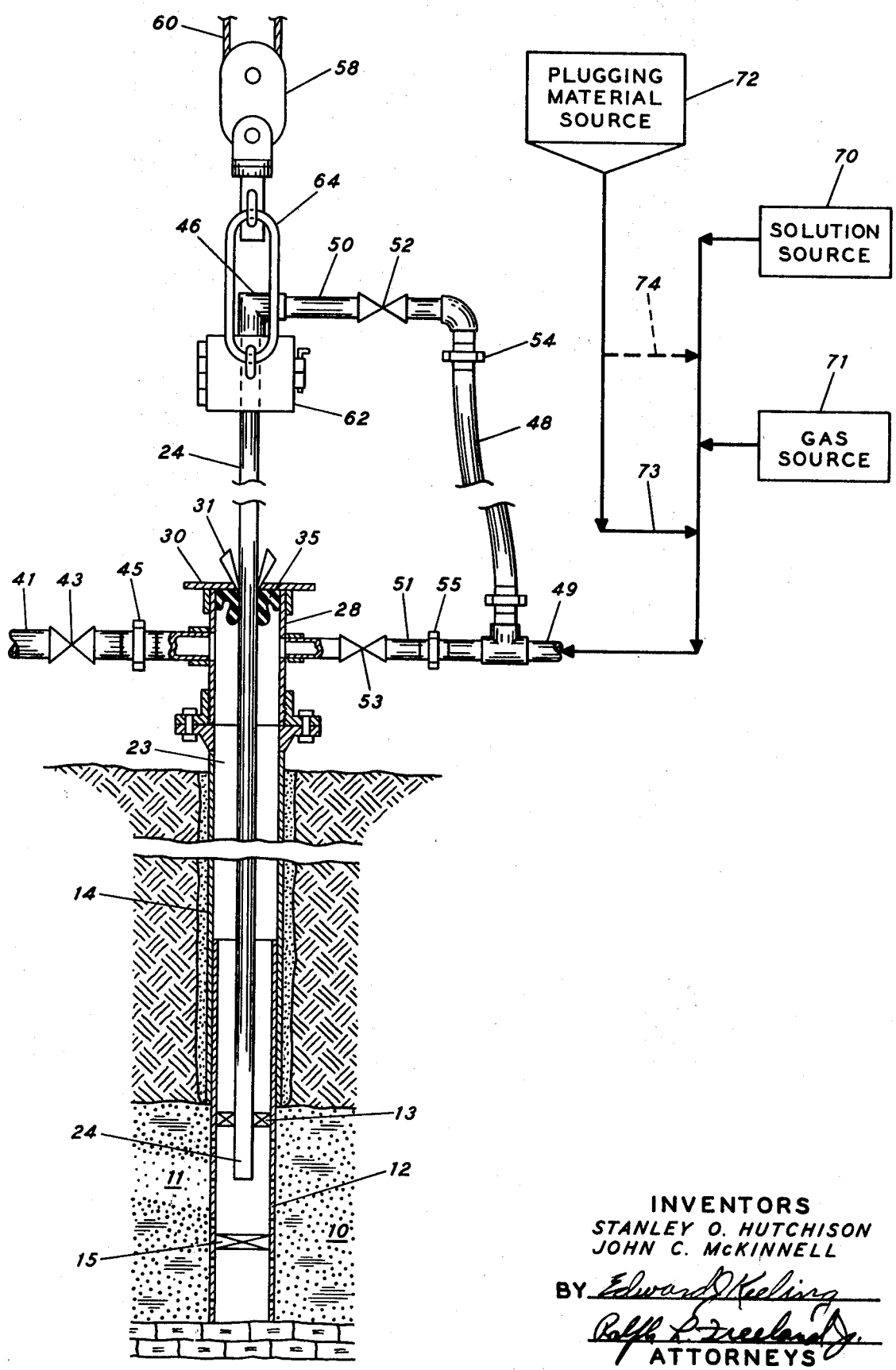
INVENTORS
STANLEY O. HUTCHISON
JOHN C. McKINNELL
BY Edward J Keeling
Ralph L Freeland Jr.
ATTORNEYS

METHOD OF PLACING PARTICULATE MATERIAL IN AN EARTH FORMATION WITH FOAM

CROSS REFERENCE TO RELATED APPLICATIONS

The present invention is related to the field of inventions disclosed and claimed in copending U.S. applications Ser. No. 704,832, filed Feb. 12, 1968, now U.S. Pat. No. 3,463,231; Ser. No. 720,977, filed Apr. 12, 1968, now U.S. Pat. No. 3,486,560, and Ser. No. 807,766, filed Mar. 13, 1969.

BACKGROUND OF THE INVENTION

This invention relates to a method of placing material in an earth formation penetrated by a well and, more particularly, this invention provides for utilizing an aqueous-gas foam to carry material down a well and into a formation penetrated by a well.

As is known in the art, there are many occasions when it is desired to place material in an earth formation penetrated by a well. For example, it is often desirable to place lost circulation material in a highly porous zone when drilling a well. This is so because the highly porous zone may be causing what is known in the art as lost circulation. The porous zone may be taking drilling fluid in such amounts that none remains for circulation up the hole. Similarly, in water injection wells one highly porous interval of a formation may be taking all or substantially all of the injected water, thereby preventing good water flood results over the entire producing formation. The problem also comes up in producing wells where an unconsolidated formation may cause sand to be deposited in a producing well. It is often desirable to place material, such as sand, gravel or other material, in a formation adjacent a well liner to overcome such problems. Such technique, for example, is shown in U.S. Pat. No. 2,905,245 wherein graded sand is placed in an earth formation adjacent a well liner. It is also often desirable to place liquids, such as acid or solvents, in a particular zone or formation. Although many techniques have been developed there is still need for a practical, efficient method for placing a large variety of such material in a formation penetrated by a well.

SUMMARY OF THE INVENTION

The present invention is directed to a method of placing material in a well utilizing foam as the carrier media. A foam is generated at the earth's surface and is injected into a well to a position adjacent the location where it is desired to place the material. The material is placed in the foam and is carried to the location by the foam and is deposited there and the foam is permitted to break to place the material in the formation.

BRIEF DESCRIPTION OF THE INVENTION

The present invention provides a method for placing material, such as plugging material, or acid or a sand or gravel pack material, in a predetermined location in a well. In accordance with the invention, a liquid-gas foam is formed by contacting a suitable liquid, such as an aqueous foamable solution, with a gas, such as air, to form a foam suitable for use in a well. The material which it is desired to locate in the well is added to the foam and the foam having the material entrained therein is injected by suitable means, such as a tubing string, down a well to a position adjacent the formation in which the material is to be located. The foam is then directed into such formation and the material contained in the foam is deposited therein. After the desired amount of such material is positioned into the formation foam injection is stopped and the foam is allowed to break to deposit the material in the formation.

OBJECTS OF THE INVENTION

A particular object of the present invention is to provide a method of locating a material in an earth formation penetrated by a well by carrying such material down a well in an aqueous-gas foam and injecting the foam and the material into such a formation. Further objects and advantages of the present invention will become apparent from the following detailed description read in light of the accompanying drawing which is made a part of this specification.

BRIEF DESCRIPTION OF THE DRAWING

The drawing illustrates a view of the preferred embodiment of apparatus assembled in accordance with the invention for use in placing material in a well using a foam carrier.

DESCRIPTION OF THE PREFERRED EMBODIMENT

Refer now to the drawing where the preferred embodiment of apparatus assembled in accordance with the present invention is illustrated. The drawing shows an elevation view, partially in section, of a well penetrating an oil-producing formation 10. For purposes of describing the present invention, it is assumed that the producing formation 10 contains a highly permeable (section) 11 into which it is desired to place an amount of particulate matter such as sand to prevent the formation from inflowing sand or other undesirable material into the well. The producing formation 10 along with the permeable portion 11 contains a perforated or otherwise suitably slotted well liner 12. The well liner 12 is connected by suitable means to a string of casing 14 which extends from the upper portion of the producing formation to the earth's surface.

In accordance with the preferred embodiment of the invention, a tubing string 24 is positioned in the well through a suitable wellhead 28. The particular size and type of the tubing string depends on the particular well being serviced. Both segmented tubing strings and continuous tubing strings are suitable for use in the present invention. When using a segmented tubing string, slips 31 are positioned on a slip base plate 30 which is connected to the top of the wellhead 28. The slips are used to hold the tubing string during make up of the string. Stripper rubber 35 is used in the wellhead 28 to prevent leakage of foam past the tubing string where it enters the wellhead. The tubing string is run in the well and its lower end is located adjacent the formation into which material is to be placed. A packer 15 may be used to pack off the well below such formation. The well annulus 23 is packed off above the porous formation 11 by packer 13 so that fluids leaving the bottom end of the tubing string will be forced into the desired location. It is also contemplated that the well annulus 23 may be filled with a column of foam above packer 13 by means of injecting such foam through line 51 through valve 53 into the well annulus. In many instances packer 13 may be done away with simply by using such a foam column. The foam may be later removed from the annulus through blooie line 41 when valve 43 is opened.

Foam is formed by mixing together a foamable solution and a gas. The foam must be a relatively stable foam capable of carrying the material downhole. A suitable foamable solution source 70 and a gas source 71 are located on the surface. Suitable piping extends from these sources to a common conduit 49. This conduit 49 is connected to both the tubing string 24 and the well annulus 23. The conduit is connected to the tubing string 24 through flexible conduit 48, hammer connection 54, conduit 50 and elbow joint 46. Valve 52 is used to control flow of foam to the tubing string. Conduit 49 is connected to the well annulus 23 by means of conduit 51 and connection 55 via wellhead 28. Valve 53 controls flow of foam to the well annulus. Thus foam may be circulated in a normal manner, i.e., down the tubing and up the annulus, or foam circulation may be reversed, i.e., down the annulus and up the tubing. The material which is to be placed in earth formation is located in the material source 72. The material is preferably added to the foam after it has been formed, as indicated by line 73. Alternatively, the material may be added to the liquid foamable solution prior to forming the foam by the alternative route indicated by line 74. This latter route 74 is preferred when the material is liquid and it is desired to combine the material in the foam. When the liquid is to be carried in slug form, of course, it is added to the foam column via line 73 while foam generation is temporarily halted.

The foam is formed by bringing a foamable solution of a surfactant and a gas together. The preferred foam is an aqueous-air foam. Water and, if desired, a suitable stabilizing agent are mixed to produce a foamable solution. Suitable foam and other specific surfactants which go into the foamable solutions that make them are described in detail in the above-noted application, Ser. No. 704,832, filed Feb. 12, 1968, and now U.S. Pat. No. 3,463,231. The disclosure of such application is incorporated herein by reference. A preferred foam for use in this invention is a $C_{11}$–$C_{14}$ alkylbenzene sulfonate (ABS) preferably the ammonium salt. The ABS should be added to water to form a foamable solution in an amount of between 0.5 to 1.0 parts per weight per 100 parts water. The foamable solution is mixed with air in a gas-to-liquid volume ratio of between 3 to 50 standard cubic feet to one gallon. Superior results are obtained when the foam has a gas-liquid volume ratio between 10 to 20 s.c.f. to 1 gallon.

As noted above, the material to be added to the liquid can be added either prior to or after the foam has been formed. Suitable pressure tanks are available for adding a liquid material to the pressurized foam system. When the material in source 72 is a solid material, it can be carried in a liquid slurry and added to the pressurized system utilizing a pressure vessel such as is used in sand and gravel packing. Alternatively a screw extruder may be utilized for introducing particulate solid material into the high pressure foam conduit.

In the preferred form of the invention, the foam having the material included therein is injected down the well through tubing string 24. Thus valve 52 on line 50 is open to admit foam to the tubing and valve 53 on line 51 is closed to prevent foam from entering the well annulus. The foam is directed down tubing string 24 and is forced out the lower end into the closed chamber adjacent formation 11. The foam and the material carried therewith moves out into the formation and deposits the material therein. After a desired amount of material is so positioned foam injection may be terminated and the tubing and packers removed from the well. The well is then ready for production or water injection.

While preferred embodiments of the invention have been shown and described, it is evident that modifications thereof can be made by one skilled in the art without departing from the scope of the invention.

We claim:

1. A method of positioning solid particulate material in a well comprising the steps of preforming a gas and liquid foam having a gas-to-liquid volume ratio of between 3 and 50 to 1 standard cubic feet per gallon and formed from a foamable solution containing between 0.5 to 1.0 parts per weight surfactant per 100 parts liquid, placing solid particulate material for use in a formation penetrated by a well in such foam, flowing said foam containing said solid particulate material down a well and injecting said foam and said solid particulate material into a preselective formation penetrated by said well.